US005460342A

United States Patent [19]
Dore et al.

[11] Patent Number: 5,460,342
[45] Date of Patent: Oct. 24, 1995

[54] RETAINER ELEMENT, SPECIFICALLY FOR MOTOR VEHICLE BODIES

[75] Inventors: Pascal Dore, Haguenau; Jean-Paul Holtzmann, Niedersoultbach, both of France

[73] Assignee: TRW Carr France SNC, Ingwiller, France

[21] Appl. No.: 221,023

[22] Filed: Mar. 31, 1994

[51] Int. Cl.⁶ ...................................... F16L 3/08
[52] U.S. Cl. ........................... 248/74.2; 248/68.1
[58] Field of Search ............... 248/74.3, 65, 68.1, 248/74.2; 411/913, 437; 24/16 PB, 17 AP

[56] References Cited

U.S. PATENT DOCUMENTS

| | | | |
|---|---|---|---|
| 4,358,080 | 11/1982 | Wolker | 411/432 X |
| 4,518,297 | 5/1985 | Kraus | 411/437 |
| 4,550,891 | 11/1985 | Schaty | 248/68.1 |
| 4,570,303 | 2/1986 | Richmond | 24/17 AP X |
| 4,728,064 | 3/1988 | Caveney | 248/74.3 |
| 4,859,128 | 8/1989 | Kraus | 248/68.1 X |
| 4,905,942 | 3/1990 | Moretti | 248/68.1 |
| 5,033,701 | 7/1991 | Kraus | 248/68.1 |
| 5,154,376 | 10/1992 | Baum | 248/74.3 |
| 5,251,857 | 10/1993 | Grice | 248/74.2 X |

*Primary Examiner*—J. Franklin Foss
*Attorney, Agent, or Firm*—Daniel G. Blackhurst

[57] ABSTRACT

A retainer element 1 for mounting and supporting various tubular components from a structural element such as a motor vehicle frame or body comprises at least one retainer region 2, 2', 2" and a mounting region 3 connected thereto. The mounting region 3 includes an orifice equipped with holding components that function to engage and retain on a fixation piece such as a threaded stud carried on a vehicle body. The orifice of the mounting region 3 traverses completely through the mounting region and can be threaded on the fixation piece from either of the two extreme end surfaces 6, 7 of the orifice.

8 Claims, 1 Drawing Sheet

U.S. Patent    Oct. 24, 1995    5,460,342
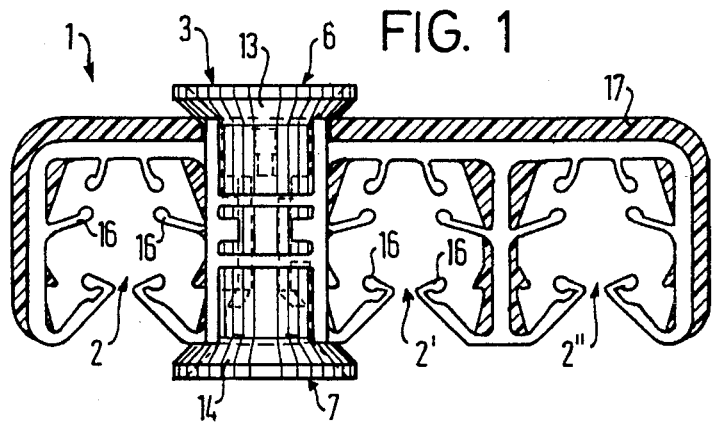
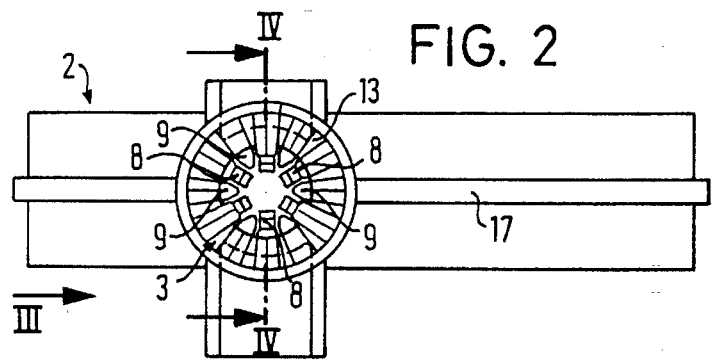
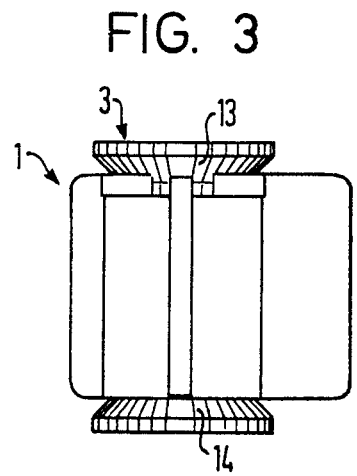
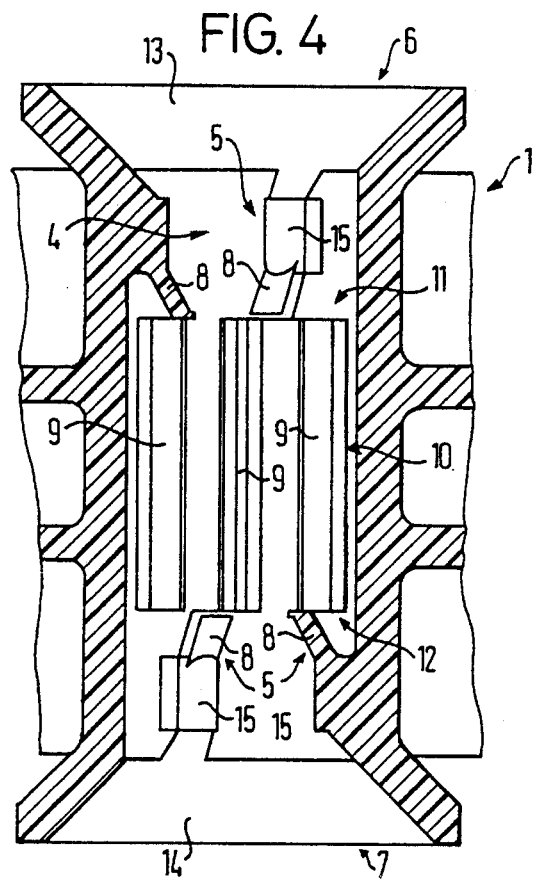
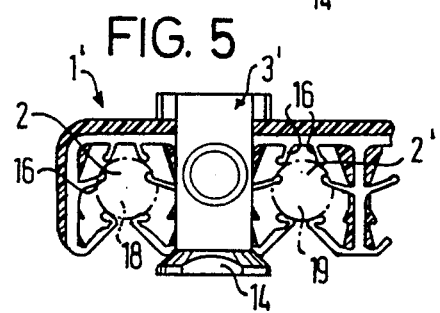
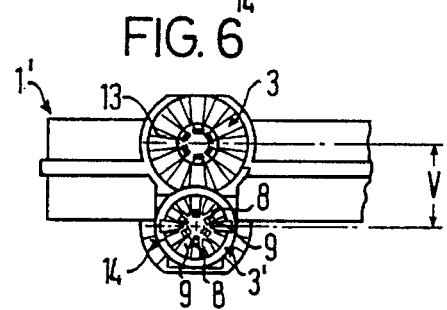

RETAINER ELEMENT, SPECIFICALLY FOR MOTOR VEHICLE BODIES

BACKGROUND OF THE INVENTION

The present invention relates to a retainer element comprising at least one retaining region with a mounting region connected thereto. The mounting region is pierced by an orifice equipped with internal elements that act in a holding capacity with respect to retaining the retainer element on a fixation piece such as a threaded bolt or stud.

Retaining elements of this type are known in the prior art (for example, see Germam Patent DE 30 02 031 C2 and British Patent A2,098,699). These prior art retaining elements are structurally arranged in a manner so as to be able to be connected from only one side to a fixation piece constituting, for example, a threaded bolt or stud extending from an automobile frame or body panel. Thus, the application range of these prior retaining elements is limited because of the unilateral installation requirement.

SUMMARY OF THE INVENTION

On the other hand, the present invention has the objective of providing a retainer element of the initially mentioned kind which has a wider application range.

According to the invention, this objective is attained as a result of the fact that the orifice of the mounting region extends completely through the mounting region and can be threaded on the fixation piece from either of its two opposite ends. This produces the advantage that the retainer element according to the invention can be placed on a fixation piece, such as a threaded stud, through the intervention of its traversing orifice starting from either side with 180° reversal. The range of applications of this retainer element according to the invention is thus notably expanded.

According to another aspect of the invention, a predetermined number of internal components acting in a holding capacity is respectively affected in one threading direction on the fixation piece. Because of that fact, only a certain number of the components acting in a holding capacity beneficially engage themselves with the fixation piece, depending upon the starting side from which the retaining element according to the invention is put into place on the fixation piece.

In a retainer element in which the internal components acting in a holding capacity are in the form of elastic tongues distributed about the periphery of the orifice, respective groups of the elastic tongues are preferably arranged in the vicinity of each of the two extreme end surfaces of the orifice. The elastic tongues of the two groups are, preferably, beneficially mutually staggered in the longitudinal direction. They may, for example, be arranged in a zigzag pattern.

According to another feature of the invention, there may be three elastic tongues distributed about the periphery of the orifice respectively arranged in the vicinity of an extreme end surface of the orifice. Furthermore, the possibility also exists of providing longitudinal ribs in the orifice between the elastic tongues. The longitudinal ribs act to center the fixation piece, such as a bolt or threaded stud, in the orifice. Thus, the retaining element according to the invention is positioned on the bolt or stud in a functionally secure manner and it is adjusted or located with precision through the intervention of the longitudinal ribs. Its retention is assured by the elastic tongues, regardless of the side from which the element is placed on the bolt or stud.

According to another characteristic of the invention, the longitudinal ribs can be located in the central region of the orifice and the elastic tongues can join themselves respectively to the extreme ends of longitudinal ribs with the tongues being respectively oriented to extend toward the longitudinal ribs.

In order to facilitate the mounting of the retainer to a bolt or stud, the sides of the orifice of the mounting region can respectively present an insertion zone, to which the elastic tongues attach themselves in the internal space of the orifice. The insertion zones are preferably designed in the shape of a truncated cone, so that the retaining element according to the invention can be threaded on the bolt or stud without problem, via the intervention of the insertion zone.

According to another aspect of the invention, the elastic tongues can respectively comprise a fixation region, to which the insertion zones in the shape of a truncated cone attach themselves. This affords a supplementary adjustment with respect to the retaining element according to the invention relative to a fixation piece designed as a bolt. In a variation of the aforementioned embodiment, there is likewise afforded the possibility of arranging two mounting regions in juxtaposition with one of the mounting regions presenting an insertion zone in the shape of a truncated cone on one side, and with the other mounting region presenting an insertion zone in the shape of a truncated cone on the other side. This likewise permits lateral guiding of the retaining element, according to which starting side of the latter is put into place on the fixation piece.

The retaining element can comprise several retaining regions, the mounting region or regions being interpositioned between these retaining regions.

BRIEF DESCRIPTION OF THE DRAWINGS

The above and other objects and advantages will become apparent from the following description when read in conjunction with the accompanying drawings wherein:

FIG. 1 is a side elevational view of the preferred embodiment of the retainer element of the invention;

FIG. 2 is a top plan view of the retainer element of FIG. 1;

FIG. 3 is an end view of the retainer element taken in the direction of the Arrow III of FIG. 2;

FIG. 4 is a partial cross-sectional view of the retaining element taken on line IV—IV of FIG. 2;

FIG. 5 is a side elevation of a retainer element according to another embodiment having two mounting regions; and, FIG. 6 is a partial top plan view of the retainer element according to FIG. 5.

DETAILED DESCRIPTION OF THE PREFERRED EMBODIMENT

Referring more particularly to the drawings wherein the showings are for the purpose of illustrating a preferred embodiment of the invention only and not for the purpose of limiting same, FIGS. 1–3 illustrate the preferred form of the retainer element 1 as comprising a one-piece, molded plastic component intended for retaining and supporting elongated elements such as tubes or cables from a subjacent structural component, for example, a motor vehicle frame or body. For that purpose, the element 1 presents three retaining portions 2, 2', 2" designed to resiliently engage and hold tubes or cables. The element 1 further includes a mounting region 3 interposed between the retaining portions 2 and 2'. The mounting region 3 is designed, in a manner subsequently to be described in detail, to allow the element 1 to be joined to an affixation piece such as a thread bolt or stud (not shown) attached to the vehicle body or frame.

As mentioned above, the retainer regions 2, 2', as well as 2", serve for example, for the reception of tubes or cables and for that reason they are provided with elastic and resilient arms 16 which act on the exterior circumference of tubes 18 or 19 respectively illustrated in FIG. 5 by way of a somewhat schematic drawing. The upper surfaces of the retainer regions 2, 2', 2" are reinforced by an outwardly extending rib 17.

The mounting region 3 is pierced by a through orifice 4 that extends perpendicularly to the longitudinal direction of tubes 18 and 19. According to FIGS. 2 and 4, the through orifice 4 is equipped with internally positioned components 5 that function in a holding capacity and engage on the exterior circumference of a fixation piece, for example, a bolt or stud with coarse threading, and which, as a result, retains the element on a support. According to FIGS. 2 and 4, the components 5 that act in a holding capacity are shown in the form of elastic tabs or tongues 8 distributed about the inner circumference of orifice 4. In the present embodiment a first group of, three of the elastic tongues are arranged in circumferentially spaced relationship in the vicinity of one of the extreme end surfaces 6 and a second group of three elastic tongues are likewise arranged in the vicinity of the other extreme end surface 7. According to FIGS. 1, 3, and 4, the extreme end surfaces 6 and 7 of the mounting region 3 are respectively designed with insertion zones having the shape or a truncated cone 13 and 14 leading into the through opening orifice 4. Thus, the retaining element 1 according to the invention can, without any structural modification, be mounted on a bolt with, coarse thread, from one or the other side and satisfy the function of a support or of a stay.

FIG. 4 shows the presence of longitudinal ribs 9 in the center of the through orifice 4. The longitudinal ribs 9 have as their purpose the centering of the retaining element on the fixation piece, which may as noted earlier be, for example, a bolt with coarse threading. The elastic tongues 8 are associated with the longitudinal ribs 9 situated in a central region be of the orifice 4. Preferably, the tongues 8 are located at the extreme end regions 11 and 12 of the ribs 9. Moreover, as can be seen, the tongues 8 are respectively oriented to extend towards the ribs 9. Also, as is clearly evidence in FIG. 2, the elastic tongues 8 of the two regions are mutually staggered in the longitudinal direction.

The specific configuration of the mounting region 3, comprising the two groups of elastic tongues 8, as well as the longitudinal ribs 9, affords the advantage that the retaining element 1 according to the invention is placed precisely in centered position on the bolt with coarse threading, in the central region 10, regardless of whether one starts from extreme end surface 6 or 7. The elastic tongues 8, in association with the longitudinal ribs 9, consequently produce excellent centered retaining of the element on the fixation piece (e.g., the bolt with coarse threading).

A review of FIG. 4 reveals that the elastic tongues 8 are attached adjacent to the insertion zones 13 and 14, respectively toward the internal space of orifice 4. The tongues 8 each respectively comprise a fixation region 15 that is contiguous to truncated insertion zones 13 and 14. The upper surfaces of the fixation regions 15 can themselves contribute to the centering of the retaining element 1 in accordance with the invention, on a fixation bolt not shown in detail.

In the embodiment according to FIGS. 1 to 4, there is provided only one mounting region 3 with which several retaining regions 2, 2', 2" are connected The embodiment according to FIGS. 5 and 6 indicate that it is likewise possible to arrange two mounting regions 3 and 3' in juxtaposition. In this arrangement, one of the mounting regions 3 presents a truncated insertion zone 13 on one side, and the other mounting region 3' presents a truncated insertion zone 14 on the other side.

Likewise, a retaining element 1', according to the invention, can, in turn, be put into position on a fixation piece not shown in detail, starting from two sides and with a reversal of 180° with the additionally offered possibility of lateral staggering in V-shape, according to FIG. 6, relative to that of the two mounting regions 3 and 3', which respectively provide the retaining of element 1'.

The specific configuration of the mounting region 3, or respectively the mounting regions 3 and 3' acts in a simple fashion to provide retaining element 1 with a greatly expanded application range. It is not mandatory that this element 1 or 1' under consideration be equipped with respective retainer regions 2 or 2' or 2" in order to assure the retaining of tubes. The faculty, likewise, exists (which is not illustrated in detail) of providing other retainer configurations.

It goes without saying that numerous modifications can be made to the described and represented retainer element, without going outside the scope of the invention as defined in the appended claims.

Having thus described the invention, it is claimed:

1. In a retainer element (1) comprising at least one retaining region (2, 2', 2") and one mounting region (3) that is connected to the latter and is pierced by an orifice (4) equipped with holding components (5) adapted to hold the element on a threaded fixation piece, the improvement wherein the orifice (4) of the mounting region (3) extends completely through the mounting region and is equipped with groups of holding components (5) adjacent each end, the groups of holding components adjacent each end, arranged to allow the retainer element to be readily threaded on the threaded fixation piece from both of the two extreme end surfaces (6, 7).

2. A retaining element according to claim 1 wherein each group of the holding components (5) comprises elastic tongues (8) distributed about the circumference of each end of orifice (4).

3. A retainer element according to claim 2 wherein each group includes three of the elastic tongues (8) distributed over the circumference of orifice (4) in the vicinity of an extreme end surface (6 or 7).

4. A retainer element according to claim 2 wherein longitudinal ribs (9) are interpositioned between the separate groups of elastic tongues (8) in the orifice (4) for centering of the fixation piece in the orifice (4).

5. A retainer element according to claim 6 wherein the longitudinal ribs (9) are located in a central region (be) of the orifice (4) and wherein the elastic tongues (8) are associated with said longitudinal ribs (9) in the extreme end regions (11, 12) of the ribs (9) and, further, wherein the elastic tongues (8) of each group are respectively inclined toward the longitudinal ribs (9).

6. A retainer element according to claim 5 wherein both ends of the orifice (4) of mounting region (3) have an insertion zone in the shape of a truncated cone (13, 14).

7. A retainer element according to claim 1 wherein there are two mounting regions (3, 3') arranged in juxtaposition.

8. A retainer element according to claim 1 comprising several retaining regions (2, 2', 2") with the mounting regions (3, 3') interpositioned between the retaining regions (2, 2', 2").

* * * * *